(12) United States Patent
Itasaka et al.

(10) Patent No.: US 10,835,779 B2
(45) Date of Patent: Nov. 17, 2020

(54) ACTION INFORMATION PROCESSING DEVICE AND ACTION INFORMATION PROCESSING METHOD

(71) Applicant: SEIKO EPSON CORPORATION, Tokyo (JP)

(72) Inventors: Yosuke Itasaka, Tatsuno-machi (JP); Osamu Takahashi, Matsumoto (JP); Michihiro Nagaishi, Shimosuwa-machi (JP); Hideaki Yamada, Shimosuwa-machi (JP); Yuji Kamichika, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 612 days.

(21) Appl. No.: 15/800,292

(22) Filed: Nov. 1, 2017

(65) Prior Publication Data
US 2018/0133547 A1    May 17, 2018

(30) Foreign Application Priority Data

Nov. 11, 2016 (JP) ................. 2016-220244

(51) Int. Cl.
*A63B 24/00* (2006.01)
*G06F 1/16* (2006.01)
(Continued)

(52) U.S. Cl.
CPC ...... *A63B 24/0006* (2013.01); *A63B 24/0003* (2013.01); *A63B 69/3667* (2013.01);
(Continued)

(58) Field of Classification Search
None
See application file for complete search history.

(56) References Cited

U.S. PATENT DOCUMENTS

2006/0099556 A1*  5/2006  Yeo ............... A63B 24/0003
                                                          434/247
2012/0316004 A1   12/2012  Shibuya
(Continued)

FOREIGN PATENT DOCUMENTS

| JP | 2003-190352 A | 7/2003 |
| JP | 2005-109202 A | 4/2005 |
| JP | 2012-254205 A | 12/2012 |

*Primary Examiner* — Gregory J Toatley, Jr.
*Assistant Examiner* — Terence E Stifter, Jr.
(74) *Attorney, Agent, or Firm* — Oliff PLC

(57) ABSTRACT

An action information processing device includes: a biological sensor which acquires biological information; a motion sensor which acquires action information including a first action indicating a predetermined action and a second action executed before the start of the first action; an information acquisition unit which acquires the biological information and the action information; a mental information processing unit which estimates mental state information from the biological information; an action decision unit which calculates an action of a subject from the action information and decides whether the first action is success or failure, based on a predetermined decision condition; and an action advice output information unit which outputs action advice information about the second action, based on the mental state information about the second action and a result of the decision about the first action by the action decision unit.

8 Claims, 13 Drawing Sheets

(51) Int. Cl.
  *G09B 19/00* (2006.01)
  *A63B 69/36* (2006.01)
  *A63B 71/06* (2006.01)
  *G06F 3/01* (2006.01)
  *G04G 99/00* (2010.01)
  *G04G 21/02* (2010.01)

(52) U.S. Cl.
  CPC ........... *G04G 99/006* (2013.01); *G06F 1/163* (2013.01); *G06F 1/1694* (2013.01); *G06F 3/014* (2013.01); *G06F 3/015* (2013.01); *G09B 19/0038* (2013.01); *A63B 2024/0012* (2013.01); *A63B 2071/0666* (2013.01); *G04G 21/025* (2013.01); *G06F 2200/1637* (2013.01)

(56) References Cited

U.S. PATENT DOCUMENTS

| | | | |
|---|---|---|---|
| 2014/0106892 A1* | 4/2014 | Lin | G09B 19/0038 473/222 |
| 2017/0189757 A1* | 7/2017 | Brothers | A63B 69/0071 |

* cited by examiner

ACTION INFORMATION PROCESSING DEVICE AND ACTION INFORMATION PROCESSING METHOD

BACKGROUND

1. Technical Field

The present invention relates to an action information processing device and an action information processing method.

2. Related Art

With the development of a physical quantity sensor, it has become possible to measure a human movement in detail and to give advice on exercise such as sports, based on information of the measured movement. JP-A-2005-109202 discloses that, in the game of golf as an action, biological information such as body temperature and pulse rate can be acquired from a sensor provided on the grip of a golf club, and that a variety of information about the play can be collected and recorded from an image pickup information acquisition device and a weather information measuring device provided on each golf course. This aims at helping an improvement in golf playing skills based on various kinds of information recorded after the play.

However, with the invention disclosed in JP-A-2005-109202, various kinds of information are provided after the play, and the provided information is data of results only. Therefore, the player can only analyze the provided data by him/herself and make efforts to reflect the data on his/her next play, and cannot be given advice on the current play.

Also, in sports, the state of mind or so-called mental state during the play, for example, calmness, concentration, emotional ups and downs or the like, in addition to improvements in skills, can greatly influence the result. Thus, many sports players guide themselves to a normal mental state by executing, immediately before games, a series of motions or so-called "routine" decided by themselves. However, a routine is not always repeating the same action and players need training to learn a routine that is correct for themselves.

SUMMARY

An advantage of some aspects of the invention is that an action information processing device is provided which provides advice information so that a correct routine can be executed with respect to individual routine actions, using biological information and action information acquired from a biological sensor and a motion sensor, and based on biological information and action information at the time of execution of a routine (practice swing or the like) immediately before a successful action, for example, a tee shot in golf that results in a player's personal best carry or the like, and thus allows the player to learn a correct routine.

The invention can be implemented as the following forms or application examples.

Application Example 1

An action information processing device according to this application example includes: a biological sensor which acquires biological information; a motion sensor which acquires action information including a first action indicating a predetermined action and a second action executed in association with the first action before the start of the first action; an information acquisition unit which acquires the biological information and the action information; a mental information processing unit which estimates mental state information from the biological information; an action decision unit which calculates an action of a subject from the action information and decides whether the first action is success or failure, based on a decision condition associated with the first action; and an action advice output information unit which outputs action advice information about the second action, based on the mental state information about the second action and a result of the decision about the first action by the action decision unit.

With the action information processing device according to this application example, based on the result of decision by the action decision unit about the first action as an action to seek a result which is a predetermined action, and the mental state information and the action information about the second action associated with the first action and executed before the start of the first action, that is, a so-called routine which is a series of motions decided by the subject him/herself, advice (assistance) on the second action for the first action to result in success can be given to the subject.

By repeatedly executing the second action based on the action advice information, the subject can learn the second action (routine) enabling the subject to shift to the first action that results in success as a normal state.

Application Example 2

The action information processing device may include a storage unit which stores reference action information to be the decision condition, basic mental information, and basic action information, the basic mental information being the mental state information about the second action associated with at least one of the first actions on which success/failure is decided by the action decision unit, and the basic action information being the acquired action information.

According to this application example, the mental information and the action information about the second action associated with the first action that results in success are stored in the storage unit as basic information. Thus, the action advice information can be provided on the biological information and the action information about the second action without referring to the first action.

Application Example 3

In the action information processing device, the action advice information output unit may compare the mental state information and the action information acquired based on the second action, with the basic mental information and the basic action information, and may generate and output the action advice information.

According to this application example, the mental information and the action information about the second action associated with the first action that results in success are stored in the storage unit as basic information. Thus, the action advice information can be provided on the biological information and the action information about the second action without referring to the first action.

In other words, simply by repeatedly executing the second action, that is, a routine action only, it is possible to learn the second action enabling a shift to the first action that results in success.

Application Example 4

The action information processing device may include a display unit which displays the action advice information.

According to this application example, the player as a subject can securely confirm the action advice information. The display unit is not limited to displaying visual information such as letters or illustrations, and may perform audio display such as an alarm or melody, or optical display such as flashing light or color light.

Application Example 5

In the action information processing device, the biological sensor may include a grip sensor.

According to this application example, the degree of tension or the straining state of the player as a subject can be easily detected.

Application Example 6

An action information processing method according to this application example includes: acquiring action information including a first action indicating a predetermined action and a second action executed in association with the first action before the start of the first action; estimating mental state information from biological information; deciding whether the first action is success or failure, based on a decision condition associated with the first action from the action information; and outputting action advice information about the second action, based on the mental state information estimated about the second action and a result of the decision about the first action.

With the action information processing method according to this application example, based on the result of decision about the first action as an action to seek a result which is a predetermined action, and the mental state information and the action information about the second action associated with the first action and executed before the start of the first action, that is, a so-called routine which is a series of motions decided by the subject him/herself, advice (assistance) on the second action for the first action to result in success can be given to the subject.

By repeatedly executing the second action based on the action advice information, the subject can learn the second action (routine) enabling the subject to shift to the first action that results in success as a normal state.

Application Example 7

The action information processing method may include storing basic mental information and basic action information, the basic mental information being the mental state information about the second action associated with at least one of the first actions on which success/failure is decided, and the basic action information being the acquired action information.

According to this application example, the mental information and the action information about the second action associated with the first action that results in success are stored as basic information. Thus, the action advice information can be provided on the biological information and the action information about the second action without referring to the first action.

Application Example 8

In the action information processing method, the outputting of the action advice information may include: comparing the mental state information and the action information acquired based on the second action, with the basic mental information and the basic action information; generating the action advice information based on a result of the comparison; and outputting the generated action advice information.

According to this application example, the mental information and the action information about the second action associated with the first action that results in success are stored as basic information. Thus, the action advice information can be provided on the biological information and the action information about the second action without referring to the first action.

In other words, simply by repeatedly executing the second action, that is, a routine action only, it is possible to learn the second action enabling a shift to the first action that results in success.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
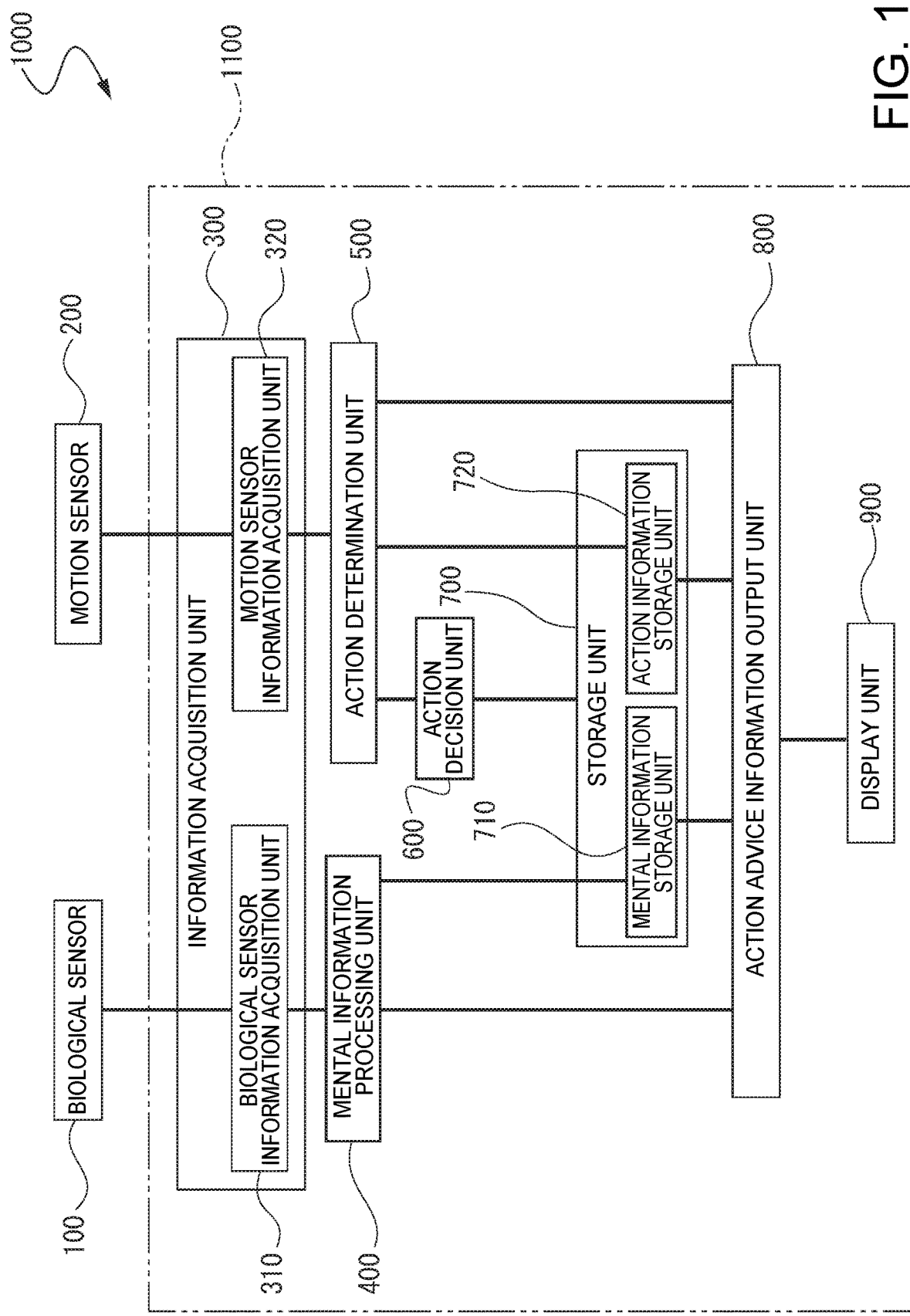
FIG. 1 shows the configuration of an action information processing device according to a first embodiment.

Hereinafter, embodiments of the invention will be described, referring to the drawings.

First Embodiment

FIG. 1 shows the configuration of an action information processing device according to a first embodiment. As shown in FIG. 1, an action information processing device 1000 according to the first embodiment includes a biological sensor 100 installed on a subject, not shown, and a motion sensor 200 installed on the subject or an implement held by the subject, for example, a golf club, a tennis racket, a baseball bat or the like, and detects various data of the subject and the implement. Based on the detected various data, the action information processing device 1000 provides action advice information, described later, to the subject.

The various data in the biological sensor 100 refers to biological information that can be collected from outside the subject, for example, pulse rate, blood pressure, and body temperature or the like. The various data in the motion sensor 200 refers to acceleration, angular velocity, angular acceleration, inertia, and position or the like. Therefore, each of the sensors 100, 200 is not a single sensor. The biological sensor 100 is a sensor group including a plurality of sensors such as a pulse wave sensor, a pressure sensor, and a temperature sensor. The motion sensor 200 is a sensor group including a plurality of sensors such as an acceleration sensor, an angular acceleration sensor, a gyro sensor, and a GPS sensor.

Figure 2:
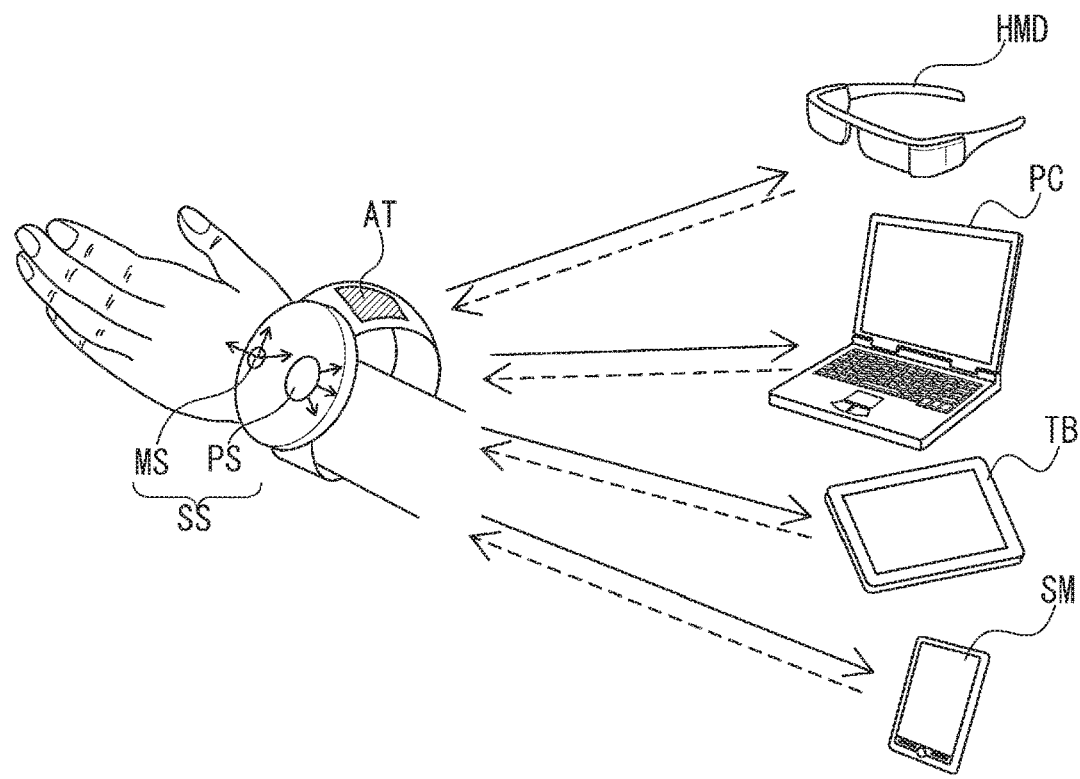
FIG. 2 shows an example of a biological sensor provided in the action information processing device according to the first embodiment.
Figure 3:
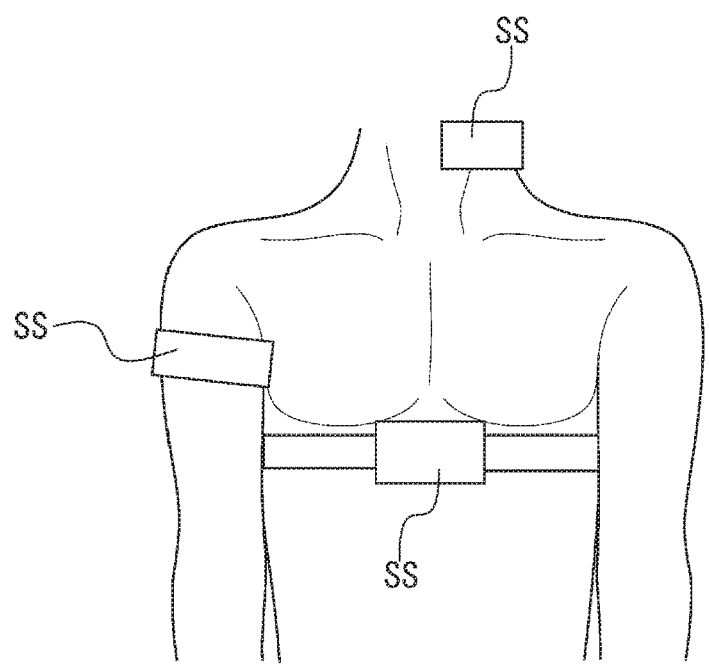
FIG. 3 shows an example of the biological sensor provided in the action information processing device according to the first embodiment.
Figure 4:
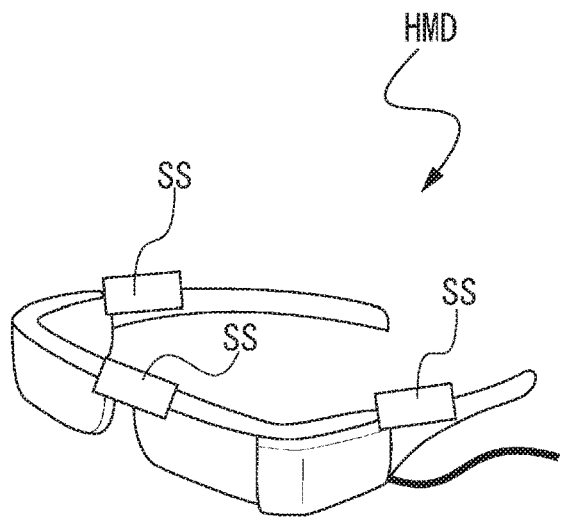
FIG. 4 shows an example of the biological sensor provided in the action information processing device according to the first embodiment.

FIGS. 2, 3 and 4 show examples of the biological sensor 100. FIG. 2 shows a wristband-type (wristwatch-type) wearable terminal as an example. As shown in FIG. 2, the wearable terminal has: a sensing unit SS including, for example, a pulse wave sensor PS and a motion sensor MS; an antenna unit AT which wirelessly transmits biological data acquired by the sensing unit SS to an information processing terminal as an information processing unit 1100, for example, a head-mounted display HMD, a personal computer PC, a tablet terminal TB, or a smartphone SM; and a biological information acquisition and processing unit and a communication unit for transmitting data from the antenna AT, not illustrated.

FIG. 3 shows an example in which the sensing unit SS is installed on the neck, upper arm or chest of the subject (human body). FIG. 4 shows an example in which the sensing unit SS is arranged at a bridge part and left and right temple parts of eyeglasses that come in contact with the subject (human body) and in which a head-mounted display HMD having a display unit (display) is employed as the eyeglasses. In both of the examples shown in FIGS. 3 and 4, a biological information acquisition and processing unit and a communication unit for transmitting data from the antenna AT, not illustrated, are provided.

Figure 5:
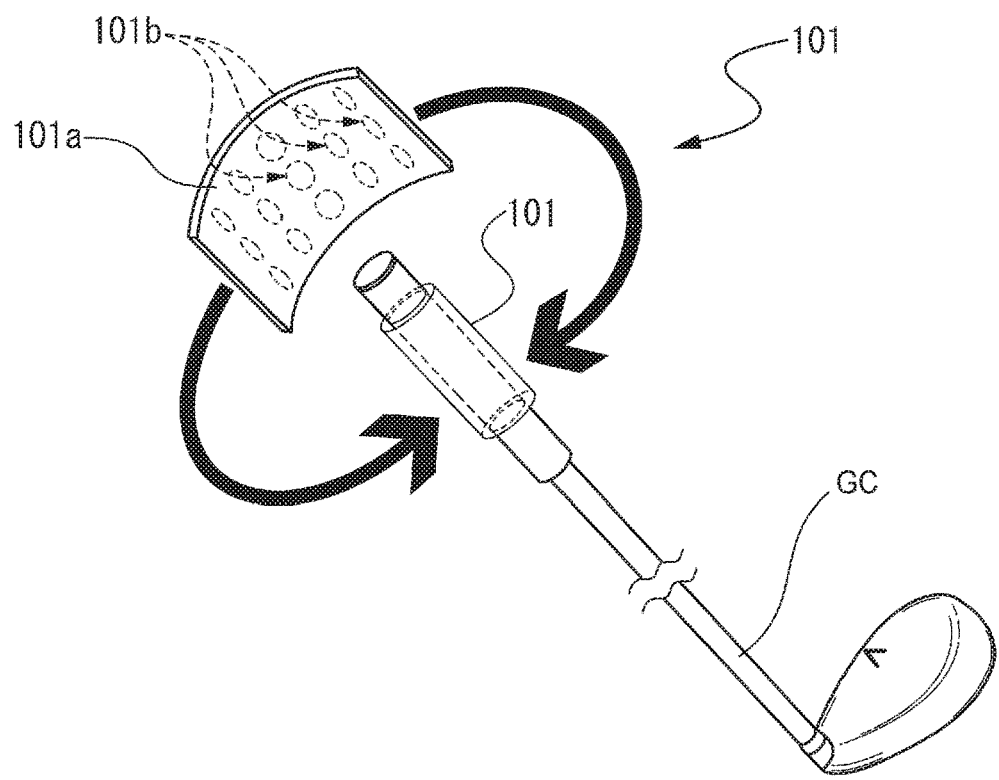
FIG. 5 shows a form of grip sensor.
Figure 6:
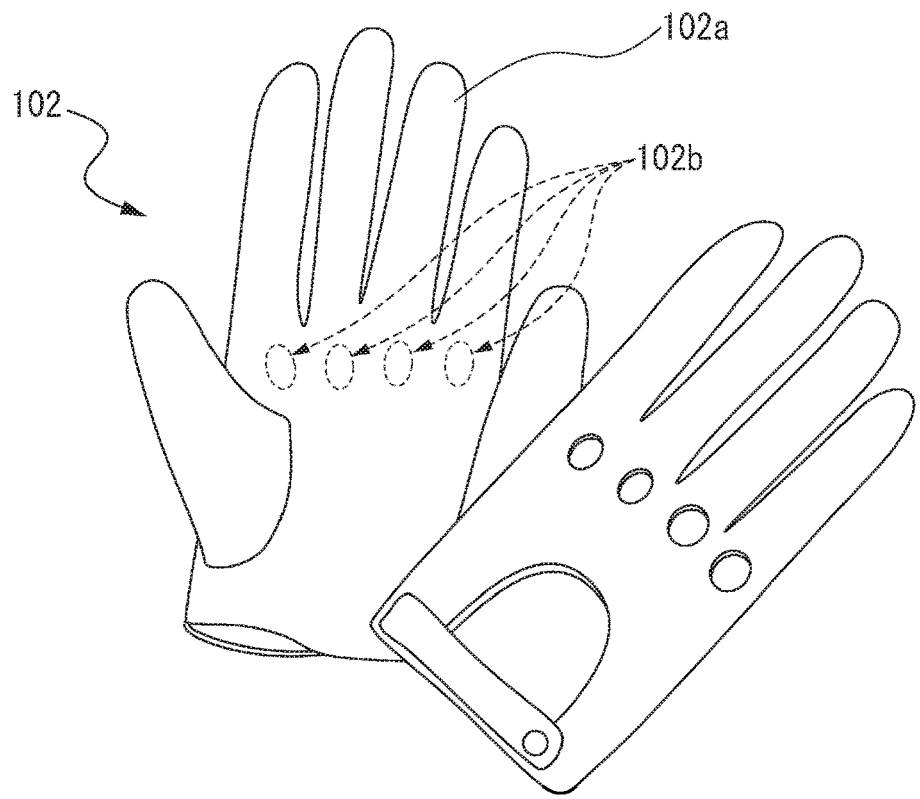
FIG. 6 shows a form of grip sensor.

In the action information processing device 1000 according to this embodiment, it is preferable that a grip sensor is provided as the biological sensor 100. FIGS. 5 and 6 show configuration examples of the grip sensor. A grip sensor 101 shown in FIG. 5 is in the shape of a sheet that can be installed on a grip part of a golf club GC. The grip sensor 101 includes, for example, a plurality of pressure sensors 101b arranged on a surface fastener 101a as a base. The grip sensor 101 is wound around the grip part of the golf club GC and thus can detect the grasping power with which the player grasps the grip.

A grip sensor 102 shown in FIG. 6 includes a pressure sensor 102b on the palm side of a glove 102a worn by the player. When the player wears the grip sensor 102 and grasps the grip, the grasping power can be detected. With the provision of the grip sensors 101, 102, it is possible to detect the degree of tension of the subject more accurately.

Figure 7:
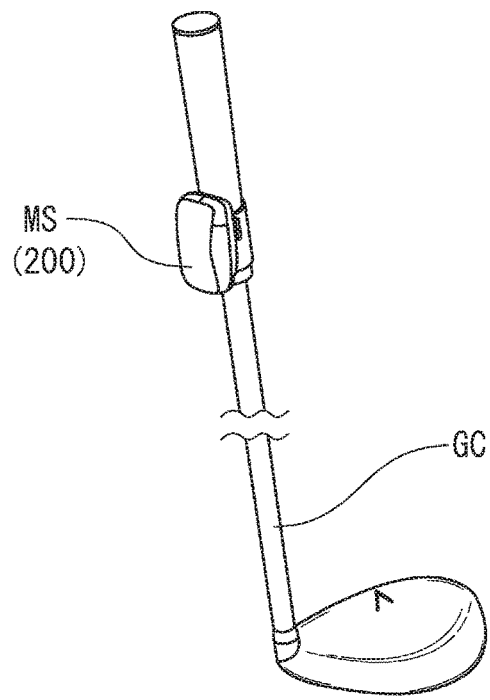
FIG. 7 shows an example of a motion sensor provided in the action information processing device according to the first embodiment.

FIG. 7 shows an example of the motion sensor 200. A motion sensor MS as the motion sensor 200 shown in FIG. 7 is installed on a grip part of a golf club GC and detects the trajectory, velocity, acceleration and the like of the golf club GC swung by the subject (person). The motion sensor MS is provided with a motion information acquisition and processing unit and a communication unit for transmitting data, not illustrated.

The information processing unit 1100 provided in the action information processing device 1000 shown in FIG. 1 includes at least an information acquisition unit 300, a mental information processing unit 400, an action decision unit 600, a storage unit 700, an action advice information output unit 800, and a display unit (display) 900. It is preferable that the information processing unit 1100 also includes an action determination unit 500 which determines the type of action information sent to the action decision unit 600.

The information acquisition unit 300 has a biological sensor information acquisition unit 310 which acquires biological sensor detection data detected by the biological sensor 100 and generates biological information that enables generation of mental information. The information acquisition unit 300 also has a motion sensor information acquisition unit 320 which acquires motion sensor detection data detected by the motion sensor 200 and generates action information. The storage unit 700 has a mental information storage unit 710 which stores mental information and an action information storage unit 720 which stores action information.

The mental information as mental state information and the action information in this specification will be described. The mental information refers to a numerical value that quantifies the subject's state of tension, state of excitation, state of relaxation, motivation level, feelings or emotions about the result of an action, or the like, generated based on biological information that can be collected from the subject, for example, pulse rate, blood pressure, body temperature and the like, detected by the biological sensor 100. The action information refers to a numerical value that quantifies the motion state of the subject generated based on motion information that can be collected such as the trajectory, velocity, acceleration or the like of the subject (moving body) detected by the motion sensor 200.

Figure 8:
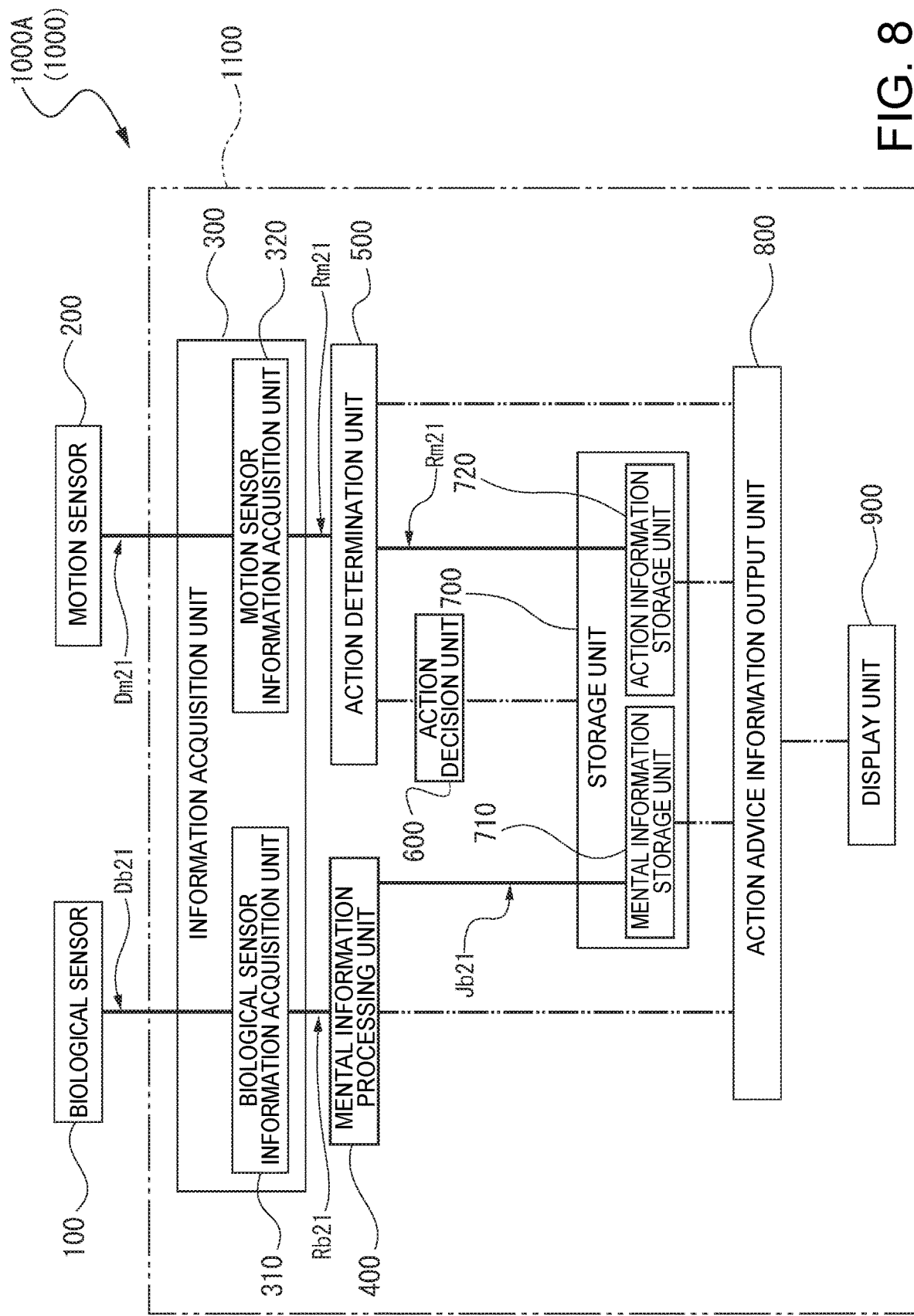
FIG. 8 illustrates effects (operations) of the action information processing device according to the first embodiment.
Figure 9:
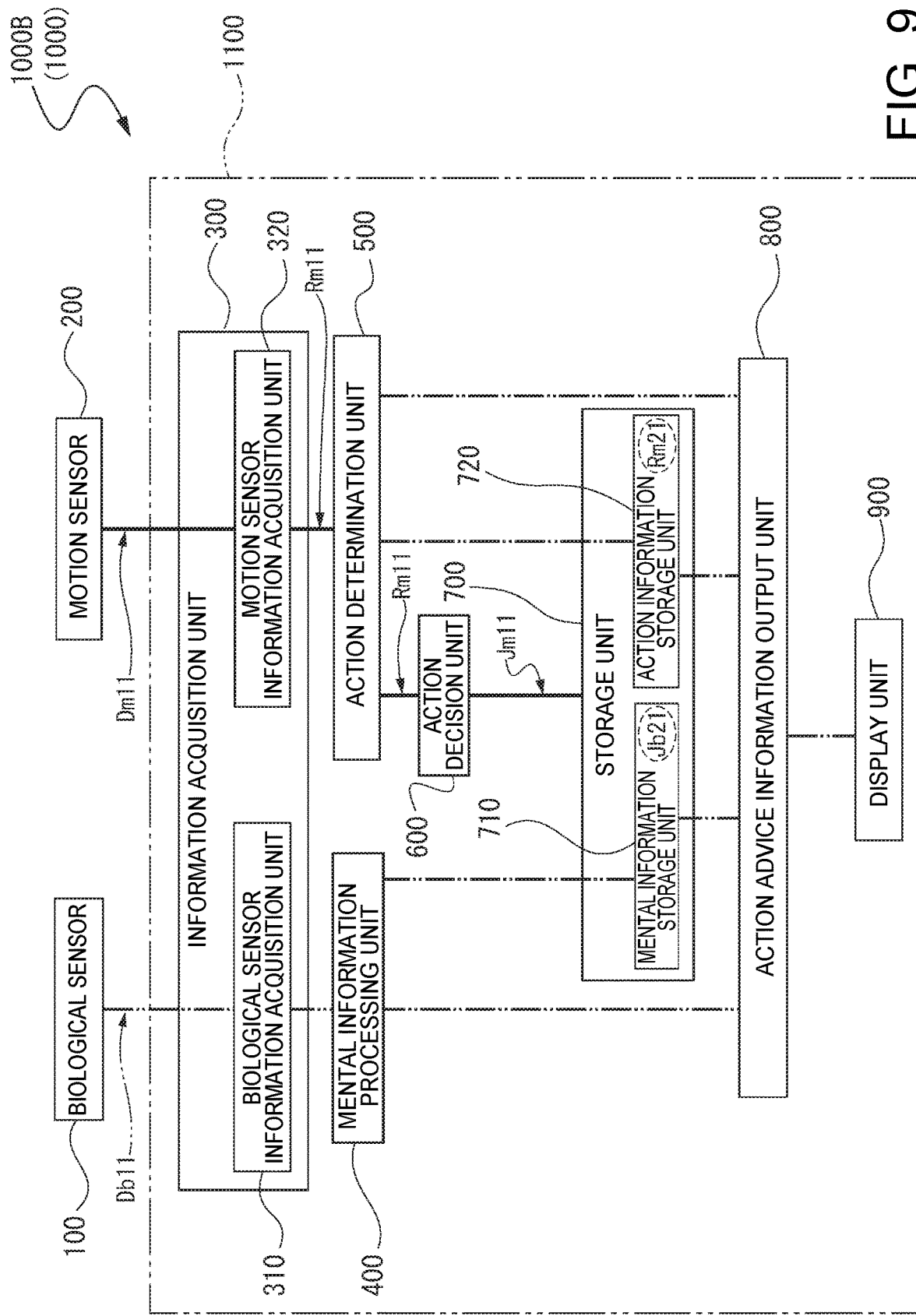
FIG. 9 illustrates effects (operations) of the action information processing device according to the first embodiment.
Figure 10:
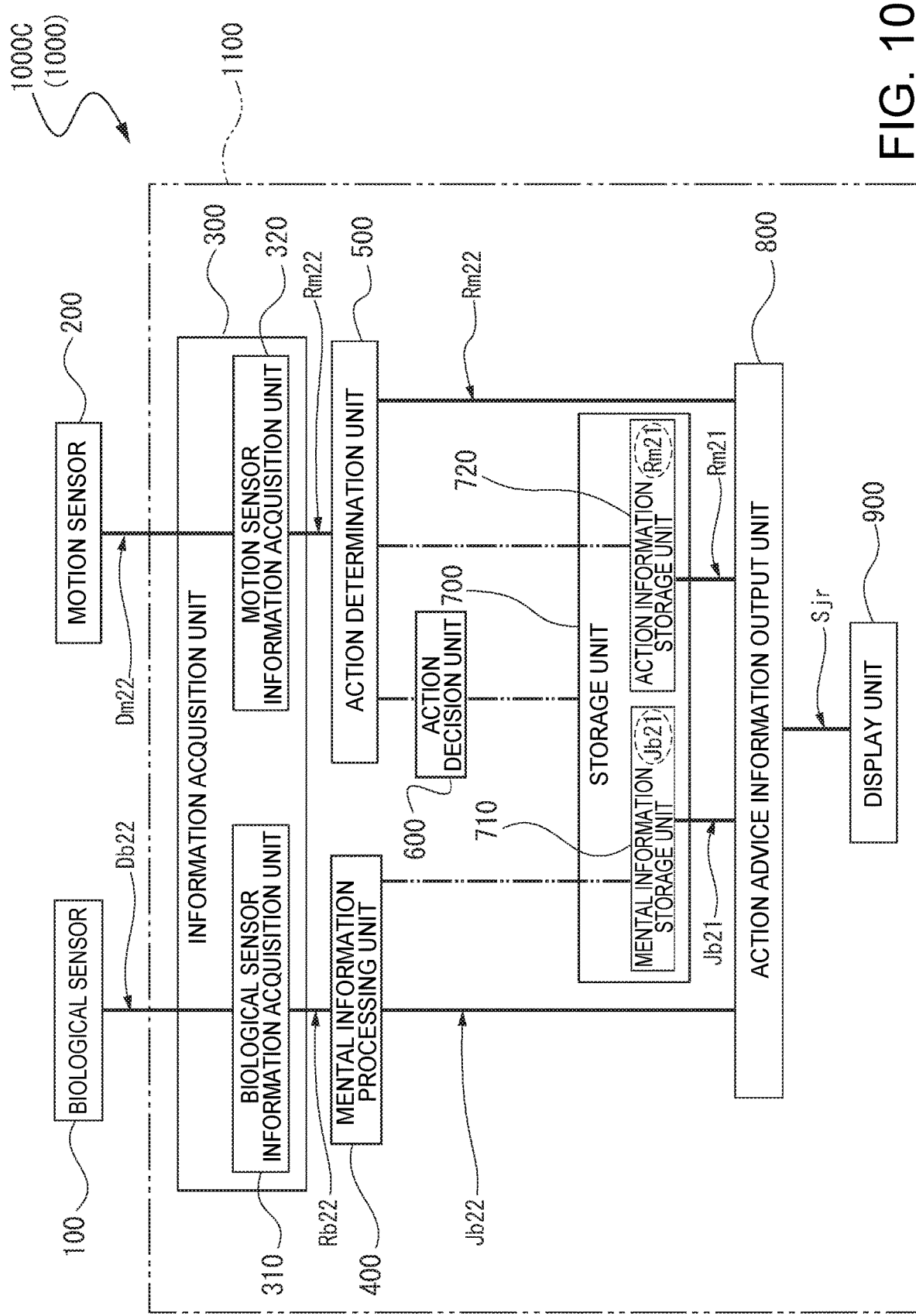
FIG. 10 illustrates effects (operations) of the action information processing device according to the first embodiment.

FIGS. 8 to 10 illustrate effects (operations) of the action information processing device 1000 according to this embodiment. In this embodiment, as a predetermined action, an action which is required to achieve a result, for example, in golf, an action of actually hitting a ball such as a shot or a putter on the green, is referred to a first action in this application. Also, in this application, a second action, which is an "action executed in order to achieve a good result", is carried out prior to the first action.

Based on mental information (hereinafter referred to as basic mental information) and action information (hereinafter referred to as basic action information) about a second action executed immediately before a correct first action that is executed, the action information processing device 1000 according to the embodiment compares mental information and action information of a new second action executed after the execution of the correct first action, with the basic mental information and the basic action information, and provides action advice on the new second action. Thus, the subject is guided to realize the second action for leading the first action to result in success, as a normal state.

An action information processing device 1000A shown in FIG. 8 shows operations at the time of executing the second action (hereinafter referred to as a first routine) executed before the start of the correct first action by the action information processing device 1000 shown in FIG. 1. As shown in FIG. 8, biological information of the subject based on the execution of the first routine is detected by the biological sensor 100 and sent to the biological sensor information acquisition unit 310 as biological data Db21. Also, action information at that time is detected by the motion sensor 200 and sent to the motion sensor information acquisition unit 320 as motion data Dm21.

The biological sensor information acquisition unit 310 generates biological information Rb21 from the acquired biological data Db21 and sends the biological information Rb21 to the mental information processing unit 400. The mental information processing unit 400 generates mental information Jb21 from the acquired biological information Rb21. The generated mental information Jb21 is stored in the mental information storage unit 710 of the storage unit 700.

The motion sensor information acquisition unit 320 generates action information Rm21 from the acquired motion data Dm21 and sends the action information Rm21 to the action determination unit 500. The action determination unit 500 can determine which of the first action and the second action is indicated by the acquired action information. The action determination unit 500 determines that the acquired action information Rm21 of the first routine indicates the second action. When it is determined that the action information Rm21 of the first routine indicates the second action, the action information Rm21 is stored in the action information storage unit 720 of the storage unit 700.

FIG. 9 shows, as an action information processing device 1000B, operations related to the first action executed after the acquisition of the mental information and the action information related to the first routine described with reference to FIG. 8.

When the first action is executed, action information about the first action is detected by the motion sensor 200 and sent to the motion sensor information acquisition unit 320 as motion data Dm11. From the motion data Dm11 acquired by the motion sensor information acquisition unit 320, action information Rm11 is generated and sent to the action determination unit 500. The action determination unit 500 determines that the acquired action information Rm11 of the first action indicates the first action, and sends the action information Rm11 to the action decision unit 600.

In the action decision unit 600, action information about a first action that results in success is stored in advance as reference action information which serves as a decision condition. The action information Rm11 acquired based on the first action is compared with the reference action information, and a success/failure decision is made on whether this first action is the first action that results in success or not. If, as the result of the decision, the first action is decided as the first action that results in success, decision information Jm11 is sent to the storage unit 700.

In the storage unit 700 having received the decision information Jm11, information that the mental information Jb21 and the action information Rm21 acquired based on the first routine and stored in the storage unit 700 are acquired based on the first routine executed immediately before the first action that results in success, that is, the first routine associated with the first action that results in success, is added. The mental information Jb21 is saved as basic mental information Jb21 in the storage unit 700. The action information Rm21 is saved as basic action information Rm21 in the storage unit 700. In the action information processing device 1000B according to the first action, mental information is not generated from biological data detected by the biological sensor 100.

In the action determination unit 500, as a measure to determine which of the first action and the second action is indicated by the acquired action information, the subject (person) can input the type of the action via an input unit, not illustrated, for example, an external operation button, a touch panel or the like, before the start of the first action or the second action, and the determination can be made based on the input information.

Alternatively, whether the action information is obtained based on the first action or based on the second action can be determined by a known action analysis program. As a known action analysis program, for example, the swing analysis program disclosed in JP-A-2012-254205 filed by the applicant of this application can be used.

As the reference action information that serves as a reference for the decision by the action decision unit 600, the action information about the first action associated with the successful result is stored in advance as the reference action information in the action decision unit 600. Alternatively, action information about a logically correct action that results in success is generated and the generated theoretical action information is stored as the reference action information in the action decision unit 600.

FIG. 10 shows, as an action information processing device 1000C, operations related to the second action (hereinafter referred to as a second routine) executed after the mental information Jb21 and the action information Rm21 of the first routine associated with the first action decided as success (good) by the action decision unit 600 shown in FIG. 9 are stored in the storage unit 700 as the basic mental information Jb21 and the basic action information Rm21.

As shown in FIG. 10, as the second routine is executed, the biological sensor 100 detects biological data Db22 and sends the biological data Db22 to the biological sensor information acquisition unit 310. The biological sensor information acquisition unit 310 generates biological information Rb22 from the biological data Db22. The mental information processing unit 400 generates mental information Jb22.

The motion sensor 200 detects motion data Dm22 and sends the motion data Dm22 to the motion sensor information acquisition unit 320. The motion sensor information acquisition unit 320 generates action information Rm22 from the motion data Dm22 and sends the action information Rm22 to the action determination unit 500.

The action determination unit 500 determines whether the acquired action information Rm22 is the action information about the first action or the action information about the second action, and determines that the action information Rm22 is a second routine that is the second action.

When the action determination unit 500 determines that the action information (action information Rm22) is associated with the second routine, the mental information Jb22 is sent from the mental information processing unit 400 to the action advice information output unit 800. Also, the action information Rm22 is sent from the action determination unit 500 to the action advice information output unit 800.

The action advice information output unit 800 compares the mental information Jb21 called from the mental information storage unit 710 with the mental information Jb22 associated with the second routine, and compares the basic action information Rm21 called from the action information storage unit 720 with the action information Rm22 associated with the second routine.

Based on the results of the comparisons by the action advice information output unit 800, action advice information Sjr including mental advice and motion advice on the second routine is generated and action advice is displayed on the display unit 900. The action advice information Sjr is transmitted from the action advice information output unit 800 to the display unit 900 via wired or wireless communication. Therefore, a communication unit, not illustrated, is provided in the action advice information output unit 800 and the display unit 900. In the case where the action advice information output unit 800 and the display unit 900 are formed as an integrated unit, the communication unit may be omitted.

Figure 11:
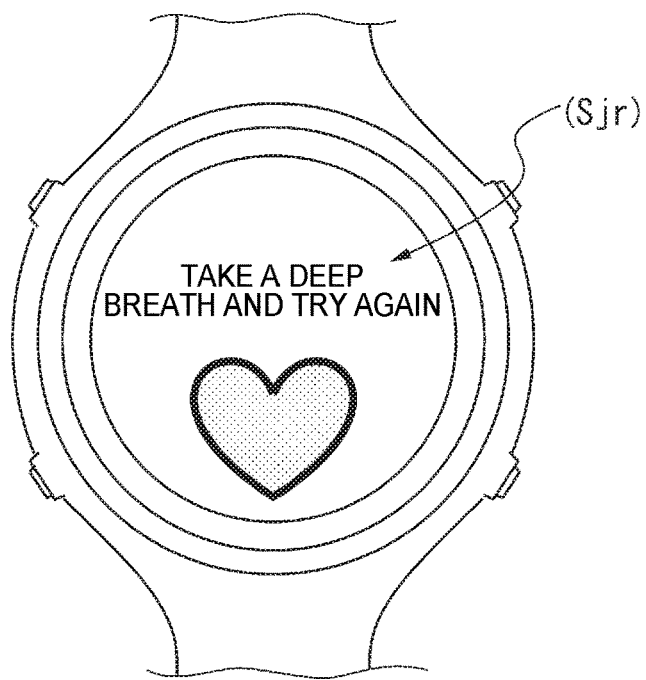
FIG. 11 shows an example of displaying action advice in the action information processing device according to the first embodiment.
Figure 12:
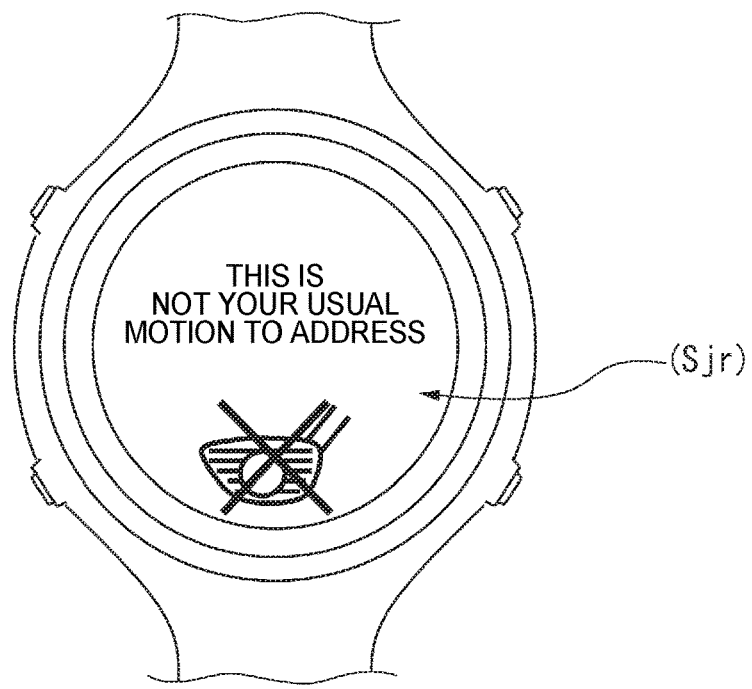
FIG. 12 shows an example of displaying action advice in the action information processing device according to the first embodiment.

FIGS. 11 and 12 show examples of the display of the action advice information Sjr in the case of a routine in a golf play. FIGS. 11 and 12 both show an example of a wristwatch-type display device. FIG. 11 shows an example of the display of mental advice. FIG. 12 shows an example of the display of motion advice.

The display of advice illustrated in FIG. 11 shows an advice message "Take a deep breath and try again", as advice which leads the subject to a state of relaxation when a state of tension is detected based on a high heart rate. The display of advice illustrated in FIG. 12 shows an advice message such as "This is not your usual motion to address" in this example, as specific motion advice based on the difference resulting from the comparison between the action information Rm22 about the second routine and the basic action information Rm21. FIGS. 11 and 12 simply show examples and the display form is not limited to these. The display of a symbol may be used instead of the display of characters.

Figure 13:
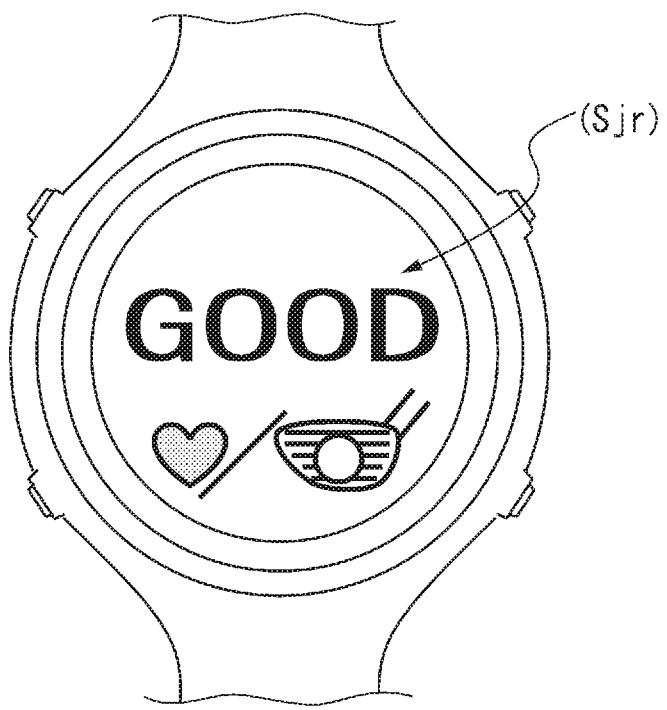
FIG. 13 shows an example of displaying action advice in the action information processing device according to the first embodiment.

When the subject (person) executes the second action again based on the displayed action advice information Sjr, the action advice information output unit 800 compares the resulting mental information Jb22 and action information Rm22 with the basic mental information Jb21 and the basic action information Rm21. If the difference is within an allowable range, it is displayed that the correct second action, that is, the correct routine, is executed, for example, as shown in FIG. 13. By repeating this, it is possible to improve the reproducibility of the correct second action that leads the first action to success and consequently improve the success rate of the first action.

In the above description, for the sake of convenience of the description, the first action that results in success is referred to as the first action, and as the second action, the second action associated with the first action is referred to as the first routine, and the second action executed after the first action is referred to as the second routine. The action advice information Sjr is provided on the second routine. The term "first" of the first action or the first routine does not mean that the action is carried out first, but it means an "action that results in success". The term "second" of the second routine means that the routine is carried out after the "first" as in the first action or the first routine.

Second Embodiment

Figure 14:
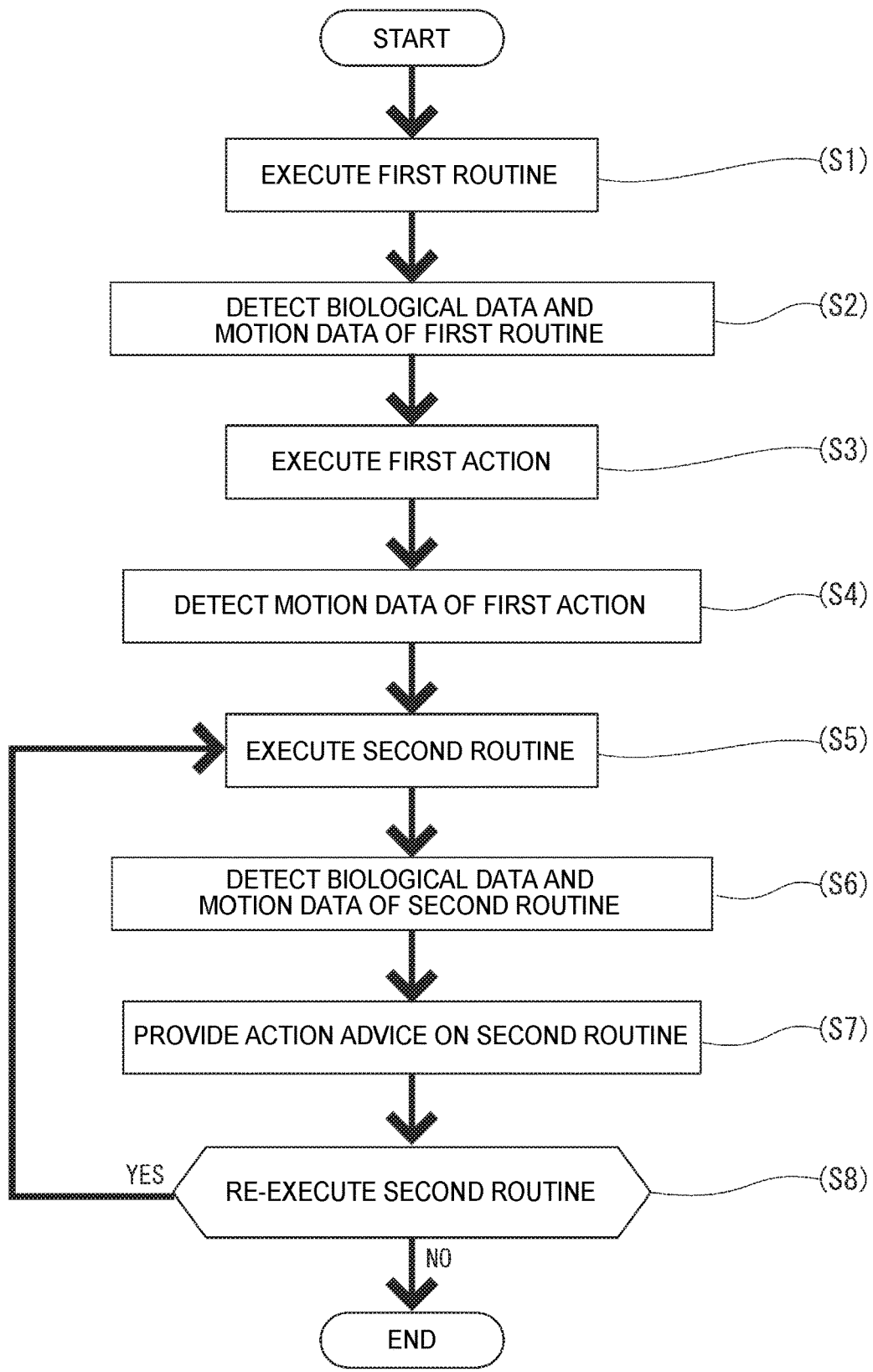
FIG. 14 is a basic flowchart of an action information processing method according to a second embodiment.

As a second embodiment, the action information processing method by the action information processing device 1000 according to the first embodiment will be described. FIG. 14 is a basic flowchart of the action information processing method according to the second embodiment. In the description of this embodiment, the "first action" used in the description of the action information processing device 1000 according to the first embodiment is used as the first action, and the "first routine" and the "second routine" are used as the second action.

Execution of First Routine

As shown in FIG. 14, in the flow of a series of processes in action information processing method according to this embodiment, the first routine is executed as the second action (S1). In the execution of the first routine (S1), a series of motions decided by the subject him/herself that is to be carried out before the execution of the first action is carried out.

Detection of Biological Data and Motion Data of First Routine

Figure 15:
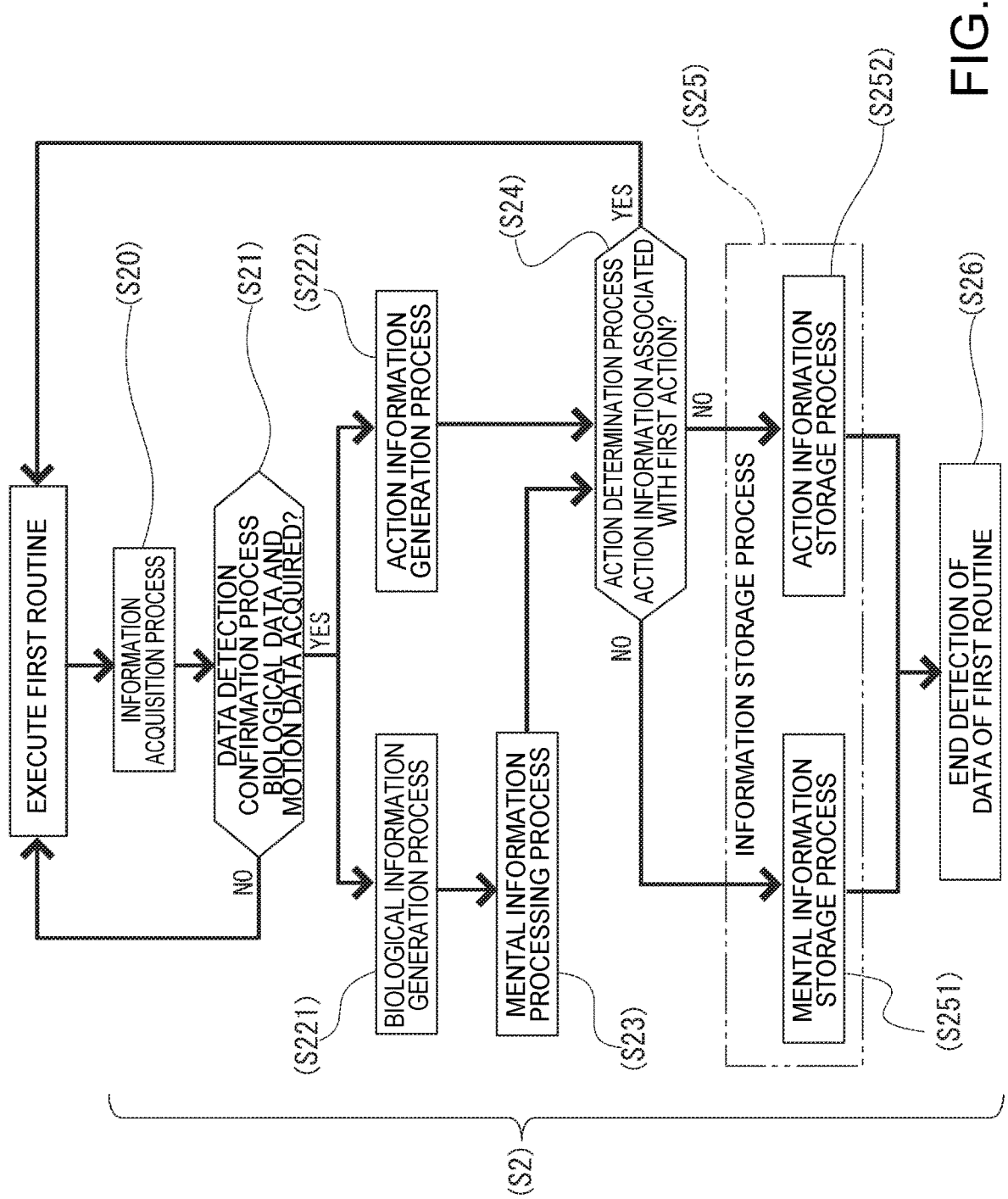
FIG. 15 is a detailed flowchart of a process (S2) of detecting biological data and motion data in a first routine in the action information processing method according to the second embodiment.

At the time of executing the first routine (S1), the detection (S2) of biological data and motion data of the first routine is executed, in which the biological data Db21 is measured and detected by the biological sensor 100 included in the sensing unit installed on the subject and in which the motion data Dm21 is measured and detected by the motion sensor 200 included in the sensing unit (see FIG. 8). FIG. 15 shows a flowchart of data processing in the process (S2) of detecting the biological data and the motion data of the first routine.

Information Acquisition Process

First, an information acquisition process (S20) is executed, in which, of the biological data Db21 and the motion data Dm21 detected by the biological sensor 100 and the motion sensor 200, the biological data Db21 is acquired by the biological sensor information acquisition unit 310 provided in the information acquisition unit 300 whereas the motion data Dm21 is acquired by the motion sensor information acquisition unit 320.

Data Detection Confirmation Process

A data detection confirmation process (S21) is carried out, in which whether the biological data Db21 and the motion data Dm21 that should be detected by the execution of the first routine (S1) are acquired by the information acquisition unit 300 or not is confirmed. In the data detection confirmation process (S21), if the acquisition of one or both of the biological data Db21 and the motion data Dm21 by the information acquisition unit 300 is unsuccessful (NO), the flow shifts to the execution of the first routine (S1) again.

In the data detection confirmation process (S21), if the acquisition of both of the biological data Db21 and the motion data Dm21 by the information acquisition unit 300 is successful (YES), the biological data Db21 and the motion data Dm21 are shifted to a step in which the biological information Rb21 and the action information Rm21 on which information processing can be performed are generated.

Biological Information Generation Process

The biological sensor information acquisition unit 310 executes a biological information generation process (S221), in which the biological information Rb21 for the subsequent information processing on the mental state is generated, based on the biological data Db21 acquired from the biological sensor 100. In this example, the biological sensor information acquisition unit 310 generates the biological information Rb21, but this is not limiting. For example, the action information processing device 1000 may be provided with a biological information generation unit, and the biological information generation unit may acquire the biological data Db21 from the biological sensor information acquisition unit 310 and generate biological information.

Mental Information Processing Process

On the biological information Rb21 generated by the biological information generation process (S221), a mental information processing process (S23) is executed by the mental information processing unit 400, and the mental information Jb21 is thus generated. Then, the mental information Jb21 is shifted to an action determination process (S24) in order to obtain a result of action determination in the action determination process (S24) by the action determination unit 500, described later.

The mental information Jb21 refers to a numerical value that quantifies the subject's state of tension, state of excitation, state of relaxation, motivation level, feelings or emotions about the result of an action, or the like at the time of the first routine, generated based on the biological information Rb21, as described above.

Action Information Generation Process

In an action information generation process (S222), the action information Rm21 for the subsequent information processing is generated from the motion data Dm21 acquired by the motion sensor information acquisition unit 320 from the motion sensor 200. The generated action information Rm21 is sent to the action determination unit 500. The flow shifts to the action determination process (S24).

Action Determination Process

The action determination unit 500 executes the action determination process (S24), in which whether the acquired action information Rm21 is action information associated with the first action or not is determined. If it is determined that the action information is associated with the first action (YES) in the action determination process (S24) by the action determination unit 500, the execution of the first routine (S1) is carried out again. The action determination unit 500 can determine whether the action information is obtained with the first action or with the second action, for example, based on the type information of the action inputted by the subject (person) before the start of the first action via an input unit, not illustrated, for example, an external operation button, a touch panel or the like, or based on a known action analysis program, as described above.

Therefore, if the action determination unit 500 determines that it is the first action (YES), that is, not the action of the first routine, the execution of the first routine (S1) is carried out again. Meanwhile, if the action determination unit 500 determines that it is not the first action (NO), that is, the action including the first routine that is the second action, the flow shifts to an information storage process (S25), in which the mental information Jb21 generated and acquired by the mental information processing process (S23) and the action information Rm21 are stored in the storage unit 700.

Information Storage Process

The information storage process (S25) includes a mental information storage process (S251), in which the mental information Jb21 is stored in the mental information storage unit 710, and an action information storage process (S252), in which the action information Rm21 is stored in the action information storage unit 720. As the mental information Jb21 and the action information Rm21 are stored in the storage unit 700 by the information storage process (S25), a message or signal is displayed on a display unit, not illustrated, as a process (S26) of ending the data detection of the first routine. The detection (S2) of the biological data and the motion data of the first routine is ended. The flow shifts to the execution (S3) of the first action shown in FIG. 14.

Execution of First Action

As shown in FIG. 14, the detection (S2) of the biological data and the motion data of the first routine ends and the execution (S3) of the first action is carried out. As described above, the first action refers to an action that is required to achieve a result, as a predetermined action executed following the first routine as the first action associated with the first routine, for example, in golf, an action of actually hitting a ball such as a shot or a putter on the green. The first action and the second action are associated with each other.

Detection of Motion Data of First Action

Figure 16:
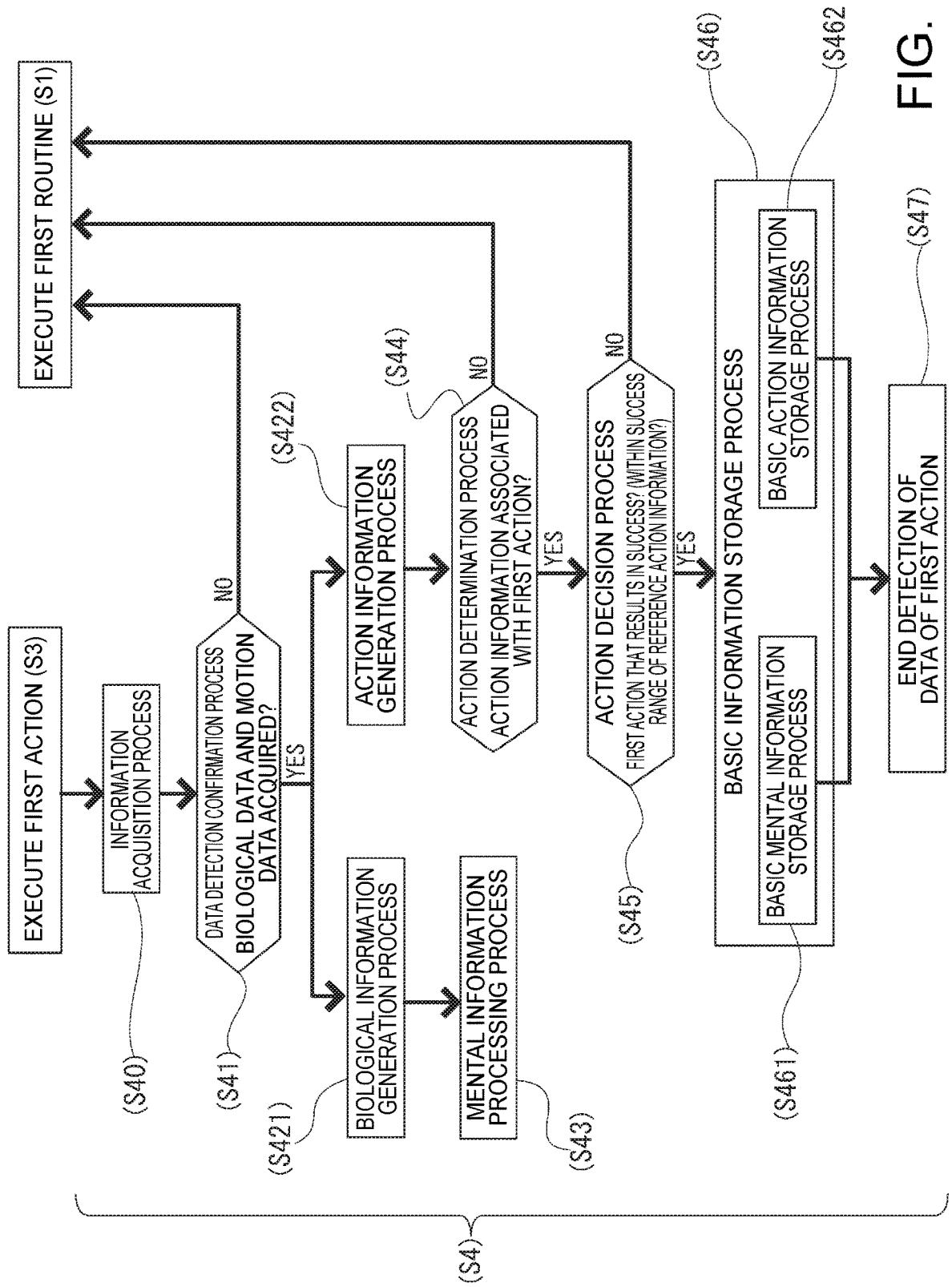
FIG. 16 is a detailed flowchart of a process (S4) of detecting motion data of a first action in the action information processing method according to the second embodiment.

At the time of executing the first action (S3), the detection (S4) of the motion data of the first action is executed, in which the motion data Dm11 is detected by the motion sensor 200 installed on the subject (see FIG. 9). FIG. 16 shows a flowchart of data processing in the process (S4) of detecting the motion data of the first action. In the detection of the motion data of the first action (S4), information processing of the biological data Db11 detected by the biological sensor 100 may also be executed in addition to information processing of the motion data Dm11 detected by the motion sensor 200. The mental information obtained from the biological data Db11 can be used for advice information for the first action.

Information Acquisition Process

First, an information acquisition process (S40) is executed, in which the motion sensor information acquisition unit 320 provided in the information acquisition unit 300 acquires the motion data Dm11 detected by the motion sensor 200. The information acquisition process (S40) may include a process in which the biological data Db11 detected by the biological sensor 100 is acquired by the biological sensor information acquisition unit 310 provided in the information acquisition unit 300.

Data Detection Confirmation Process

A data detection confirmation process (S41) is carried out, in which whether the motion data Dm11 that should be detected by the execution (S3) of the first action is acquired by the information acquisition unit 300 or not is confirmed. In the data detection confirmation process (S41), if the acquisition of the motion data Dm11 by the information acquisition unit 300 is unsuccessful (NO), the flow shifts to the execution of the first routine (S1) again.

The action information processing method according to this embodiment is a method for providing action advice on the second action associated with the first action. Therefore, if the motion data Dm11 of the first action cannot be acquired, the processes need to be carried out again, starting with the execution of the first routine (S1), which is the second action. Therefore, if the acquisition of the motion data Dm11 by the information acquisition unit 300 is unsuccessful (NO), the flow returns to the execution of the first routine (S1) and the action information processing method according to this embodiment is thus executed.

In the data detection confirmation process (S41), whether the biological data Db11 is acquired by the information acquisition unit 300 or not is not determined. Therefore, if the biological data Db11 is not acquired, a biological information generation process (S421), described later, is not executed, and the flow does not shift to a mental information processing process (S43).

However, if the acquisition of the motion data Dm11 is successful (YES) in the data detection confirmation process (S41), the biological information generation process (S421) and the mental information processing process (S43) are executed. The biological information generation process (S421) and the mental information processing process (S43) are the same as the biological information generation process (S221) and the mental information processing process (S23) in the detection (S2) of the biological data and the motion data of the first routine and therefore will not be described further. However, a shift from the mental information processing process (S43) to an action determination process (S44) is not an essential configuration.

If the acquisition of the motion data Dm11 is successful (YES) in the data detection confirmation process (S41), the flow shifts to an action information generation process (S422).

Action Information Generation Process

In the action information generation process (S422), the action information Rm11 for the subsequent information processing is generated from the motion data Dm11 acquired by the motion sensor information acquisition unit 320 from the motion sensor 200. The generated action information Rm11 is sent to the action determination unit 500. The flow shifts to the action determination process (S44).

Action Determination Process

The action determination unit 500 executes the action determination process (S44), in which whether the acquired action information Rm11 is the action information associated with the first action or not. If it is determined that the action information is not associated with the first action (NO) in the action determination process (S44) by the action determination unit 500, the processes are executed again, starting with the execution of the first routine (S1).

In the action determination process (S44), too, the action information processing method according to this embodiment is a method for providing action advice on the second action associated with the first action, and if the action information Rm11 is not the action information about the first action, the processes need to be executed, starting with the execution of the first routine that is the second action (S1). Therefore, if the action determination unit 500 determines that the acquired action information Rm11 is not the information associated with the first action (NO), the flow returns to the execution of the first routine (S1) and the action information processing method according to this embodiment is thus executed.

If it is determined that the action information Rm11 is the action information associated with the first action (YES) in the action determination process (S44), the flow shifts to an action decision process (S45).

Action Decision Process

In the action decision process (S45), the acquired action information Rm11 is compared with the reference action information inputted in advance to the action decision unit 600, and whether the first action is the first action that results in success or not is decided. If the action information Rm11 is not within the succeed range of the reference action information (NO) in the action decision process (S45), the processes are executed again, starting with the execution of the first routine (S1).

The action information processing method according to this embodiment is configured to compare the mental information and the action information of a new second action executed after the execution of the correct first action, with the basic mental information and the basic action information of the second action executed immediately before the correct first action that is executed, and thus provide action advice on the new second action and lead the first action associated with the new second action to success. Therefore, if the first action is decided as not within the success range of the reference action information and therefore decided as NO in the action decision process (S45), that is, the first action that does not result in success, the flow returns to the execution of the first routine as the second action (S1) again and the action information processing method is executed.

If the action information Rm11 of the first action is within the success range of the reference action information (YES) in the action decision process (S45), the flow shifts to a basic information storage process (S46).

Basic Information Storage Process

In the basic information storage process (S46), information that the action information Rm11 of the first action is decided as within the success range of the reference action information (YES) in the action decision process (S45) is received, and thus the mental information Jb21 stored in the mental information storage unit 710 in the mental information storage process (S251) included in the information storage process (S25) in the detection (S2) of the biological data and the motion data of the first routine is rewritten with the basic mental information Jb21, and the basic mental information Jb21 is stored.

Similarly, the action information Rm21 stored in the action information storage unit 720 in the action information storage process (S252) included in the information storage process (S25) in the detection (S2) of the biological data and the motion data of the first routine is rewritten with the basic action information Rm21, and the basic action information Rm21 is stored.

In the basic information storage process (S46), the basic mental information Jb21 and the basic action information Rm21 are stored in the storage unit 700. As a process (S47) of ending the data detection of the first action, a message or signal is displayed on a display unit, not illustrated. The detection of the motion data of the first action (S4) ends and the flow shifts to the execution of the second routine (S5) shown in FIG. 14.

Execution of Second Routine

As described above, the detection (S4) of the motion data of the first action that results in success ends. Next, the execution of the second routine (S5) is executed, in which the action advice information is provided by the action information processing method described below.

Detection of Biological Data and Motion Data of Second Routine

Figure 17:
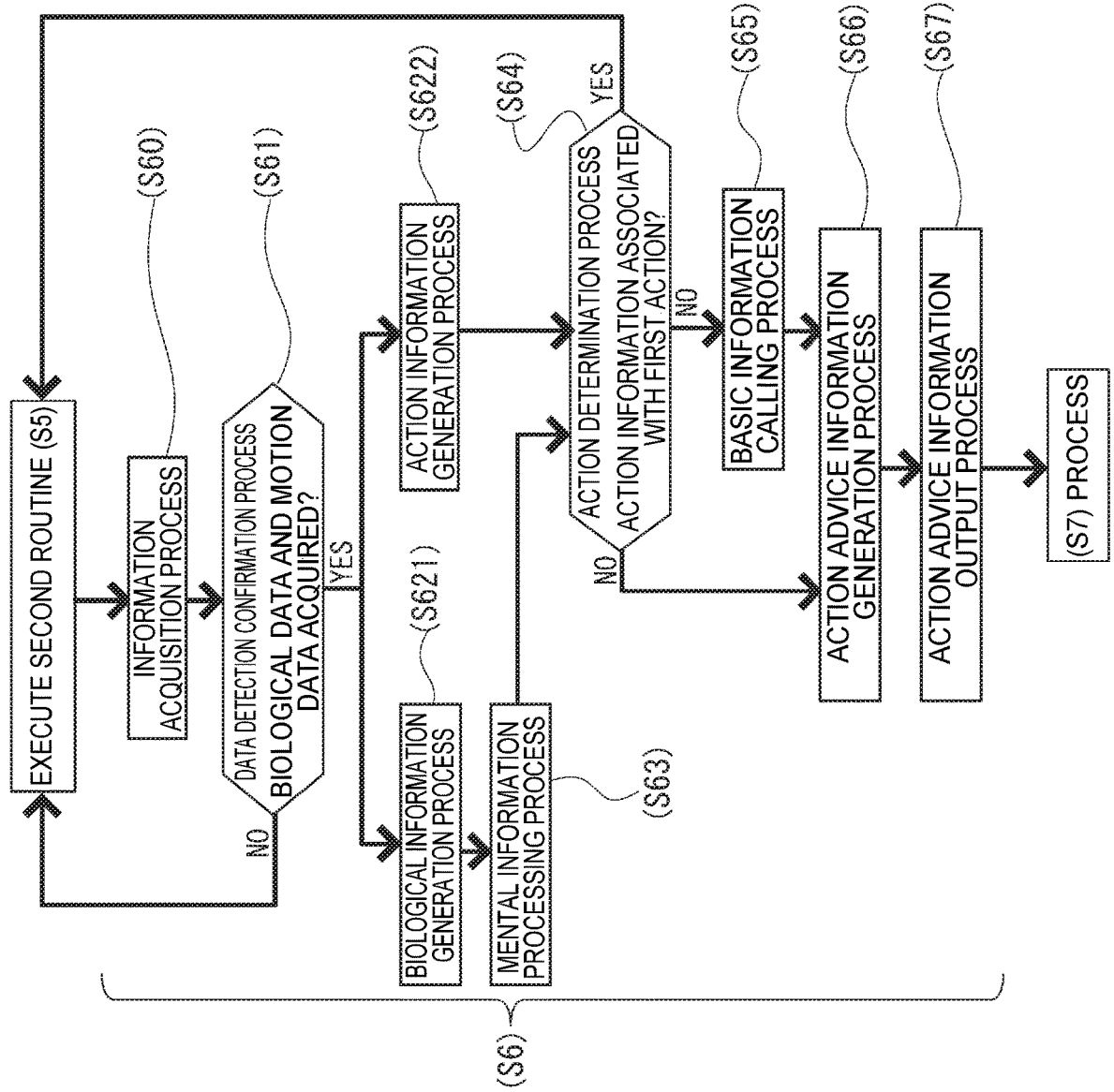
FIG. 17 is a detailed flowchart of a process (S6) of detecting biological data and motion data in a second routine in the action information processing method according to the second embodiment.

At the time of executing the second routine (S5), the detection (S6) of biological data and motion data of the second routine is executed, in which the biological data Db22 is detected by the biological sensor 100 installed on the subject and in which the motion data Dm22 is detected by the motion sensor 200 (see FIG. 10). FIG. 17 shows a flowchart of data processing in the process (S6) of detecting the biological data and the motion data of the second routine.

Information Acquisition Process

First, an information acquisition process (S60) is executed, in which, of the biological data Db22 and the motion data Dm22 detected by the biological sensor 100 and the motion sensor 200, the biological data Db22 is acquired by the biological sensor information acquisition unit 310 provided in the information acquisition unit 300 whereas the motion data Dm22 is acquired by the motion sensor information acquisition unit 320.

Data Detection Confirmation Process

A data detection confirmation process (S61) is carried out, in which whether the biological data Db22 and the motion data Dm22 that should be detected by the execution of the second routine (S5) are acquired by the information acquisition unit 300 or not is confirmed. In the data detection confirmation process (S61), if the acquisition of one or both of the biological data Db22 and the motion data Dm22 by the information acquisition unit 300 is unsuccessful (NO), the flow shifts to the execution of the second routine (S5) again.

In the data detection confirmation process (S61), if the acquisition of both of the biological data Db22 and the motion data Dm22 by the information acquisition unit 300 is successful (YES), the biological data Db22 and the motion data Dm22 are shifted to a step in which the biological information Rb22 and the action information Rm22 on which information processing can be performed are generated.

Biological Information Generation Process

The biological sensor information acquisition unit 310 executes a biological information generation process (S621), in which the biological information Rb22 for the subsequent information processing on the mental state is generated, based on the biological data Db22 acquired from the biological sensor 100. In this example, the biological sensor information acquisition unit 310 generates the biological information Rb22, but this is not limiting. For example, the action information processing device 1000 may be provided with a biological information generation unit, and the biological information generation unit may acquire the biological data Db22 from the biological sensor information acquisition unit 310 and generate biological information.

Mental Information Processing Process

On the biological information Rb22 generated by the biological information generation process (S621), a mental information processing process (S63) is executed by the mental information processing unit 400, and the mental information Jb22 is thus generated. Then, the flow shifts to an action determination process (S64). The mental information Jb22 refers to a numerical value that quantifies the subject's state of tension, state of excitation, state of relaxation, motivation level, feelings or emotions about the result of an action, or the like at the time of the second routine, generated based on the biological information Rb22, as described above.

Action Information Generation Process

In an action information generation process (S622), the action information Rm22 for the subsequent information processing is generated from the motion data Dm22 acquired by the motion sensor information acquisition unit 320 from the motion sensor 200. The generated action information Rm22 is sent to the action determination unit 500. The flow shifts to the action determination process (S64).

Action Determination Process

The action determination unit 500 executes the action determination process (S64), in which whether the acquired action information Rm22 is action information associated with the first action or not is determined. If it is determined that the action information is associated with the first action (YES) in the action determination process (S64) by the action determination unit 500, the execution of the second routine (S5) is carried out again. The action determination unit 500 can determine whether the action information is obtained with the first action or with the second action, for example, based on the type information of the action inputted by the subject (person) before the start of the second action via an input unit, not illustrated, for example, an external operation button, a touch panel or the like, or based on a known action analysis program, as described above.

Meanwhile, if it is determined that it is not the first action (NO), that is, the action including the second routine that is the second action, the flow shifts to a process for generating action advice information on the mental information Jb22 generated and acquired in the mental information processing process (S63) and the action information Rm22. That is, the mental information Jb22 and the action information Rm22 shifted temporarily to the action determination process (S64) are shifted to an action advice information generation process (S66).

Basic Information Calling Process

Moreover, the action determination unit 500 executes a basic information calling process (S65), in which the action advice information output unit 800 is instructed to call the basic mental information Jb21 and the basic action information Rm21 stored in the storage unit 700. Then, the flow shifts to the action advice information generation process (S66).

Action Advice Information Generation Process

The action advice information generation process (S66) includes an information comparison process, in which the mental information Jb22 and the action information Rm22 associated with the second routine acquired by the action advice information output unit 800 are compared with the basic mental information Jb21 and the basic action information Rm21 acquired from the first routine associated with the first action that results in success, called from the storage unit 700. Based on the result of the comparison, the action advice information output unit 800 generates action advice on the second routine. Then, the flow shifts to an action advice information output process (S67).

Action Advice Information Output Process

With the generated action advice, the action advice information output process (S67) is executed, in which action advice data corresponding to a form of output display such as the head-mounted display HMD, the personal computer PC, the tablet terminal TB or the smartphone SM provided in the action information processing device 1000, for example, as shown in FIG. 2, is outputted. In the action advice information process (S67), the measure for the output may be wired or wireless and is not particularly limited. Then, the flow shifts to the provision of the action advice (S7) on the second routine shown in FIG. 14.

Provision of Action Advice on Second Routine

The action advice information Sjr, for example, as shown in FIG. 11 or FIG. 12, is displayed on the output device, and thus the provision of the action advice (S7) on the second routine is executed.

Re-Execution of Second Routine

The subject (player) confirms the displayed action advice, and whether or not to re-execute the second routine that is the second action following the advice is determined in Step S8. If the second routine is not to be re-executed (NO), the action information processing method ends. The case where the second routine is not to be re-executed (NO) is, for example, where the difference between the mental information Jb22 or the action information Rm22 acquired in the detection of (S6) of the biological data and the motion data of the executed second routine and the basic mental information Jb21 or the basic action information Rm21 is small and the second action is expected to lead the first action to success, in the provision of the action advice (S7) on the second routine, or where the player suspends the play on his/her own will, or the like.

However, if the second routine is to be re-executed based on the action advice information Sjr (YES), the flow returns to the execution of the second routine (S5) and the action advice information Sjr can be provided again.

As described above, the action information processing method according to this embodiment is configured to compare the basic mental information Jb21 and the basic action information Rm21 obtained from the biological data Db21 and the motion data Dm21 of the first routine that is the second action associated with the first action that results in success, with the mental information Jb22 and the action information Rm22 obtained from the biological data Db22 and the motion data Dm22 of the second routine executed after the first action, thus generating and providing the action advice information Sjr to achieve the second action leading to the first action that results in success. Therefore, by repeatedly executing the second action based on the action advice information Sjr, the subject can be trained to be able to achieve the same mental state and action state as a normal state. As a result, the success rate of the first action can be improved.

Here, the mental information will be described further. First, the state of mind such as the state of tension, the state of relaxation or the state of awakening is estimated, based on biological data such as heart rate (pulse rate), blood pressure or body temperature as the result of detection by the biological sensor 100. As an example, an estimation method based on heart rate (pulse rate) will be described.

As a method of analyzing the influence of sympathetic nerves and parasympathetic nerves on heart rate, frequency analysis is commonly used. Frequency analysis (FTF) is performed on a change with time in the length between peaks (R-R interval) in a graph showing heart rate change, and a low-frequency component LF and a high-frequency component HF are separately analyzed. Based on the low-frequency component LF and the high-frequency component HF, the influence of sympathetic nerves and parasympathetic nerves can be quantified. The numerical value resulting from this quantification corresponds to the level of mental stress. Based on the magnitude of the numerical value, the state of mind such as being relaxed or tense is estimated and used for the generation of mental information.

Meanwhile, the action information is a numerical value indicating, for example, in the case of golf, the trajectory of the head of the golf club, the speed of the head of the golf club, the deflection of the player's head, or the deviation of the axis of rotation of the body, the based on the motion data detected by the motion sensor 200.

As described above, with the action information processing device 1000 and the action information processing method according to the embodiments, a series of motions decided by the subject him/herself in order to achieve a good result, that is, a so-called routine (second action), is carried out before an action to seek a result as a predetermined action, for example, in golf, an action of actually hitting a ball such as a shot or putter on the green (first action). With respect to this series of motions, the mental information and the action information about the second action executed immediately before the correct first action are used as a reference, and the mental information and the action information about the subsequent second action are compared with the foregoing mental information and action information, and action advice on the second action is provided. Thus, the subject can be guided to be able to achieve the second action for leading the first action to success, a normal state.

The application of the action information processing device 1000 and the action information processing method according to the embodiments is not limited to golf. For example, if the predetermined biological sensor 100 and motion sensor 200 can be installed on a player of baseball, tennis, badminton or fishing, as a subject, and on an implement operated by the player such as a bat, racket or fishing rod, the action information processing device 1000 and the action information processing method according to the embodiments can be applied to such cases.

Also, an information processing program to realize the action information processing method according to the embodiments is stored in an information storage device, not illustrated, in such a way as to be readable by the information processing unit 1100 provided in the action information processing device 1000 according to the first embodiment, and a necessary processing program is read out.

The entire disclosure of Japanese Patent Application No. 2016-220244 filed Nov. 11, 2016 is expressly incorporated by reference herein.

What is claimed is:

1. An action information processing device comprising:
   a biological sensor which acquires biological information;
   a motion sensor which acquires action information including a first action indicating a predetermined action and a second action executed before the start of the first action;
   an information acquisition unit which acquires the biological information and the action information;
   a mental information processing unit which estimates mental state information from the biological information;
   an action decision unit which calculates an action of a subject from the action information and decides whether the first action is success or failure, based on a predetermined decision condition; and
   an action advice output information unit which outputs action advice information about the second action, based on the mental state information about the second action and a result of the success/failure decision about the first action.

2. The action information processing device according to claim 1, comprising
   a storage unit which stores reference action information to be the decision condition, basic mental information, and basic action information, the basic mental information being the mental state information about the second action associated with at least one of the first actions on which success/failure is decided by the action decision unit, and the basic action information being the action information including at least one of the first actions on which success/failure is decided by the action decision unit.

3. The action information processing device according to claim 2, wherein
   the action advice information output unit compares the mental state information and the action information acquired based on the second action, with the basic mental information and the basic action information, and generates and outputs the action advice information.

4. The action information processing device according to claim 1, comprising a display which displays the action advice information.

5. The action information processing device according to claim 1, wherein the biological sensor includes a grip sensor.

6. An action information processing method comprising:
   acquiring action information including a first action indicating a predetermined action and a second action executed before the start of the first action;
   estimating mental state information from biological information;
   deciding whether the first action is success or failure, based on a predetermined decision condition from the action information; and
   outputting action advice information about the second action, based on the mental state information estimated about the second action and a result of the decision about the first action.

7. The action information processing method according to claim 6, comprising storing basic mental information and a basic action information, the basic mental information being the mental state information acquired based on the second action associated with at least one of the first actions on which success/failure is decided, and the basic action information being the action information including at least one of the first actions on which success/failure is decided.

8. The action information processing method according to claim 7, wherein the outputting of the action advice information comprises:

comparing the mental state information and the action information acquired based on the second action, with the basic mental information and the basic action information;

generating the action advice information based on a result of the comparison; and outputting the generated action advice information.

\* \* \* \* \*